March 21, 1933. S. A. MOREHOUSE 1,902,254
WINDSHIELD CLEANER DEVICE FOR AIRPLANES
Filed April 1, 1929
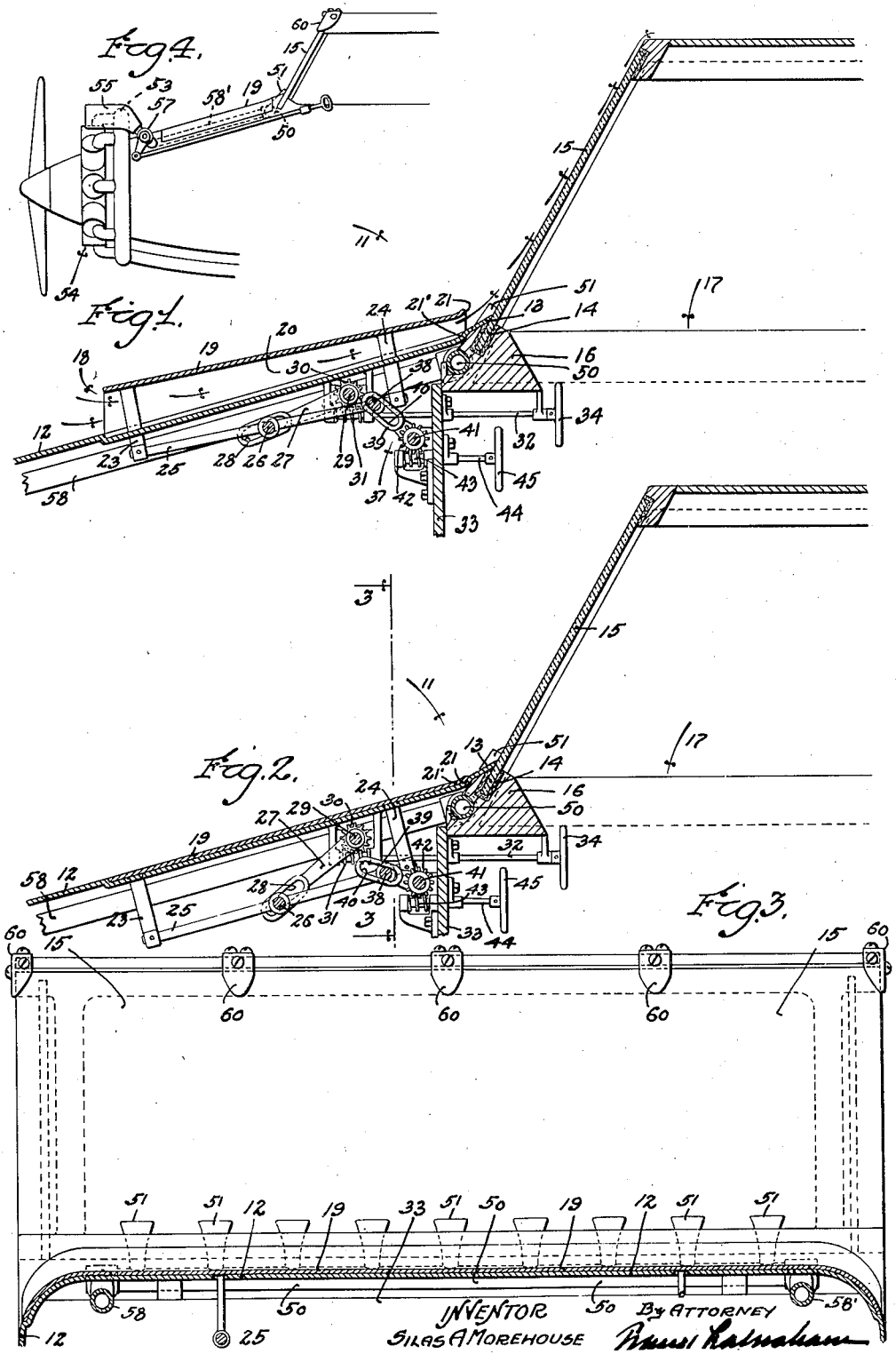

Patented Mar. 21, 1933

1,902,254

UNITED STATES PATENT OFFICE

SILAS A. MOREHOUSE, OF LOS ANGELES, CALIFORNIA

WINDSHIELD CLEANER DEVICE FOR AIRPLANES

Application filed April 1, 1929. Serial No. 351,524.

This invention relates to a device for cleaning windshields and is especially adapted for use in connection with vehicles such as airplanes which ordinarily travel at a high rate of speed.

It is well known to those familiar with aerial navigation that one of the most annoying difficulties ordinarily encountered is the impairment of vision, resulting from an accumulation of water or ice upon the windshield of the ship while flying through the clouds or in rain.

The ordinary type of windshield wipers, such as are commonly used on automobiles, cannot be conveniently adapted for use upon an airplane, due to the high wind pressure against the windshield on which the wiper must operate and, further, in view of the fact that many airplane windshields are curved to fit in with the stream line of the fuselage, making the operation of a swinging wiper on such windshields impossible. It is also apparent that wipers of this nature would be of little value in cold regions where the rain or sleet freezes to the glass as soon as it comes in contact therewith.

It is therefore a primary object of this invention to produce a windshield cleaning device which is not dependent upon a mechanical movement for its cleaning effect, but is adapted to direct a stream of rapidly flowing air across the surface of the windshield in a manner such that the drops of water are blown in a thin film over the windshield surface.

It is also an object of this invention to produce a windshield construction which is especially adapted for use in combination with my invention, having an upper edge which has no obstruction in the form of a flange or shoulder to retard the passage of water thereacross.

It is a further object of this invention to produce a windshield cleaning device of the class described, in which a stream of warm air may be directed across the surface of the glass for the purpose of melting ice which may accumulate thereon while flying through cold regions, or which may be used to maintain the windshield at a temperature sufficient to prevent the accumulation of such ice.

The general construction of my invention consists of two plate-like members which are positioned near the bottom end of the windshield, and are spaced apart in a manner such that they form an air passage which is so constructed and so positioned as to direct a stream of air across the windshield surface.

It is a noteworthy feature of this invention that the passage mentioned above is arranged to take advantage of the relative velocity between the airplane and the air, so that it may be considered as comprising a scoop which simply accumulates and redirects a part of the natural air stream across the surface of the windshield.

It will be understood that the two plate members or deflector members mentioned above may be embodied in an attachment which is entirely independent of the airplane fuselage, but I consider it preferable, for the purpose of maintaining a minimum weight of airplane construction and, further, to avoid distortion in the proper stream line surface of the fuselage cowling, to use the cowl member as the bottom plate of the deflecting scoop or passage.

It is a further object of my invention to produce a device of the class described, which may be readily adjusted from the cockpit of the airplane. In the preferred form of my invention which will be hereinafter described, this adjustment is accomplished by employing a movable upper plate, the space and angular relation of which may be varied relative to the cowl.

It was mentioned above, as an object of this invention, to provide means for directing a stream of heated air across the windshield surface. There are several ways in which this may be accomplished. For instance, one or both of the deflecting plates may be provided with suitable heating means such as an auxiliary exhaust heater or an electric heater of any well known type which may be optionally used to heat the air passage to any desired temperature. I consider it preferable, however, from the standpoint of design and control, to construct the heating means independently of the air scoop so that the two devices may optionally be used independently to deliver hot or cold air to the windshield surface, or in cooperation with each other to heat the air coming through the air scoop by mixing heated air therewith.

The invention may, therefore, be broadly thought of as embodying means for directing a stream of air across the windshield of an airplane, such means being optionally adjustable to vary the angular relation between the air stream and the windshield to suit the particular wind conditions under which the airplane is traveling, and associated with means for heating the air to prevent the accumulation of ice or to melt such ice as may inadvertently accumulate on the windshield.

The details in the construction of a preferred embodiment of my invention, together with other objects attending its production, will be better understood from the accompanying drawing, which is chosen for illustrative purposes only, and in which Fig. 1 is a sectional elevation which may be considered as having been taken through the cowl and the windshield of a cabin model airplane, and illustrates a preferred embodiment of my invention, in which the parts are adjusted for directing a stream of air across the outer surface of the windshield.

Fig. 2 is a sectional elevation similar to Fig. 1, showing the parts arranged in a position of disuse and illustrating the manner in which the upper deflecting plate is adapted to fit in with the stream line surface of the cowl.

Fig. 3 is a sectional elevation which may be considered as having been taken in a plane substantially as indicated by the line 3—3 in Fig. 2.

Fig. 4 is a more or less diagrammatic elevational view, illustrating means for delivering heated air to the windshield surface.

More particularly describing the invention as herein illustrated, reference numeral 11 indicates the front section of an airplane cabin, which consists of a cowl 12, the rear edge 13 of which is positioned adjacent to the lower edge 14 of a windshield 15.

The upper edge of the windshield is supported by a cross member 14' and the lower edge 14 of the windshield is illustrated as being mounted in a transverse beam member 16 which forms a part of the cockpit frame generally indicated by reference numeral 17.

In the form of the invention chosen for the purpose of illustration, the cowl 12 forms a lower plate member for what may be termed a wind deflecting scoop, generally indicated by reference numeral 18.

The upper member in this scoop consists of a substantially flat plate 19 which, when the device is in use, is spaced above the cowl 12, so as to form an air passage 20. The rear edge of the air passage is provided with suitable lips 21 and 21', formed upon the top and bottom members 19 and 12 respectively, so as to direct a stream of air flowing through the passage 20 across the surface of the windshield, in the manner indicated by the arrows in Fig. 1.

It is preferable, for the most satisfactory operation of a device of this character, to arrange the deflecting members in a manner such that the distance between the front edge of the passage 20 is appreciably greater than the distance between the rear edge of the passage and thereby increase the velocity of the flow of air at the point at which the air stream strikes the windshield.

It will be understood that the various conditions under which the plane may be flown make it desirable to provide means for adjusting the relation between the two plate members forming the passage 20.

In the illustrated form of my invention, this adjustment is accomplished by making the upper plate 19 adjustable relative to the cowl 12. The means whereby this adjustment is effected are perhaps most clearly illustrated in Figs. 1 and 2, wherein it will be noted that the plate member 19 is mounted upon legs or standards 23 and 24, the lower ends of which are rigidly connected by means such as the braces 25, and a cross member or tie rod 26 is rigidly interposed between intermediate points on the braces 25.

The movement of the plate 19 to and from the cowl 12 is effected by means of a suitable lever 27, which is provided with a slot 28 adapted to receive the tie rod 26, and is adapted to rotate about the pivot pin 29.

The means for rotating the lever 27 about the pivot 29 are illustrated as comprising a worm wheel 30, which is keyed to the pivot pin 29, and which is adapted to receive rotation from a suitable worm 31, mounted upon the outer end of a control shaft 32.

The control shaft 32 extends through the instrument board 33 and has a hand wheel 34 mounted upon its inner end.

It will be understood that rotation of the hand wheel 34 will be effective to impart angular movement to the lever 27, which, in turn, will raise and lower the plate 19 relative to the cowl 12.

The means for imparting angular adjustment to the plate 19 relative to the cowl 12 are generally indicated by reference numeral 37, and comprise a second transverse shaft or tie rod 38, which may be interposed between the rear portion of the brace members 25. The rear tie rod 38 is adapted to be moved up and down relative to the cowl 12 by means of an angular control lever 39, which is provided with a slot 40 adapted to receive the tie rod 38, and is adapted to receive segmental rotation about a pivot pin 41, which, in turn, is provided with a worm wheel 42 adapted to receive rotation from a suitable worm 43 having a control shaft 44 and a control handle 45 similar to those described in connection with the means for moving the plate 19 to and from the cowl.

From this construction it will be apparent that the two operating mechanisms may be used in cooperation to impart any desired spaced and angular adjustment to the plate 19.

That portion of the cowl 12 which is immediately below the plate 19 is illustrated as being depressed a sufficient distance to receive the plate 19 in the manner illustrated in Fig. 2, so that the plate lies in the cowl and forms a perfect stream line surface when the device is not being used.

It has been previously mentioned as an important object of this invention to provide means for optionally heating the stream of air which is directed against the windshield surface. Such means as has been heretofore suggested may embody heating elements associated with one or both of the deflecting members 12 or 19, but for the purpose of flexibility in the control of the unit, I consider it preferable to make the heating means a separate unit, such unit being illustrated as comprising a manifold 50, which is positioned near the lower edge of the windshield 15, and is provided with a plurality of flat jets 51, illustrated as lying against the windshield surface in a manner such that air under pressure flowing through the manifold may be blown across the outer surface of the windshield.

Air may be supplied to the manifold 16 in any preferred manner, but for the purpose of economy in construction and operation, I consider it preferable to employ a system similar to that illustrated in the diagrammatic view in Fig. 4, in which the air is heated by the exhaust pipe and manifold generally indicated at 53, which are associated with the motor 54.

The heated air is directed through a suitable shield or funnel 55 and a lead pipe 56, provided with a valve 57 and associated with delivery pipes 58 and 58', which conduct the heated air into the manifold 50.

It will be understood, of course, that this construction may be varied to suit the particular design of the airplane upon which the system is being used, and that the manifold 50 might be placed against the windshield glass 15 and provided with a series of slots or a long single slot to answer the purpose of the flat jets 13, the primary object of the construction being to deliver heated air to the lower edge of the windshield in a manner such that it may be used in cooperation with the air coming through the passage 20 for the purpose of heating the windshield and at the same time melting any deposit, such as ice, and blowing the water from the windshield surface.

In order that the air and water blowing over the surface of the windshield may have an uninterrupted course over its upper edge, I consider it desirable to use a series of clip members 60 for supporting the top of the windshield, instead of the ordinary windshield frame. It will be understood that the ordinary windshield frame has a ledge or shoulder at its upper edge, which would retard the flow of air thereover and decrease the efficiency of the cleaner.

It will be apparent from the foregoing description that this invention embodies a device which is of simple construction and which may be economically installed upon an airplane without a noticeable increase of weight.

The device may be adjusted from the cockpit of the airplane to suit the particular conditions under which the plane is being flown. It may be used for the purpose of removing either ice or water from the windshield surface, assuring a perfect vision to the pilot at all times.

It is to be understood that, while I have herein described and illustrated one preferred embodiment of the invention and suggested several modifications, the invention is not limited to the precise construction set forth above, but includes within its scope whatever changes come fairly within the spirit of the appended claims.

I claim as my invention:

1. For use in combination with the cowl and the windshield of aircraft and the like: a deflector plate mounted on and spaced above said cowl so as to form a passage for directing a stream of air across the outer surface of said windshield.

2. For use in combination with the cowl and the windshield of aircraft and the like: a deflector plate mounted on and spaced above said cowl so as to form a passage for directing a stream of air across the outer surface of said windshield; and means for adjusting the angular relation between said deflector and said cowl.

3. For use in combination with the cowl and the windshield of aircraft and the like: a deflector plate mounted on and spaced above said cowl so as to form a passage for directing a stream of air across the outer surface of said windshield; and means for mixing heated air with the air coming through said passage.

4. For use in combination with the cowl and the windshield of aircraft and the like: a deflector plate mounted on and spaced above said cowl so as to form a passage for directing a stream of air across the outer surface of said windshield; and means for mixing heated air with the air coming through said passage, embodying a manifold, means for delivering air from said manifold against the surface of said windshield into the stream of air coming through said passage, and means for delivering heated air into said manifold.

5. For use in combination with the cowl and the windshield of aircraft and the like: a deflector plate mounted on said cowl and spaced above said cowl so as to form a passage for directing a stream of air across the outer surface of said windshield; and means for moving said deflector plate into engagement with said cowl.

6. For use in combination with the cowl and the windshield of aircraft and the like: a deflector plate mounted on said cowl and spaced above said cowl so as to form a passage for directing a stream of air across the outer surface of said windshield; and means for moving said deflector plate into engagement with said cowl, said cowl being provided with a recess adapted to receive said deflector plate.

7. For use in combination with a windshield: means for removing a deposit from the surface thereof, comprising deflector members mounted adjacent one edge of said windshield surface and spaced apart to form an air passage for directing a stream of air through said passage and across said surface; and means for adjusting the position of said members relative to each other.

8. For use in combination with a windshield: means for removing a frozen deposit from the surface thereof, comprising deflector members mounted adjacent one edge of the surface of said windshield and spaced apart to form an air passage for directing a stream of air through said passage across said surface; means for adjusting the position of said members relative to each other and means for optionally heating said air.

9. For use in combination with the cowl and the windshield of an aircraft or the like: a deflector plate mounted on said cowl for directing a stream of air between said cowl and said deflector plate across the outer surface of said windshield; and means for moving said deflector plate so as to vary the space between said cowl and said plate.

In testimony whereof, I have hereunto set my hand at Los Angeles, California, this 18th day of March, 1929.

SILAS A. MOREHOUSE.